(12) United States Patent
Papaleo et al.

(10) Patent No.: US 11,832,249 B2
(45) Date of Patent: Nov. 28, 2023

(54) DYNAMIC DUTY CYCLE

(71) Applicant: QUALCOMM Incorporated, San Diego, CA (US)

(72) Inventors: Marco Papaleo, Bologna (IT); Shailesh Patil, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 16/869,346

(22) Filed: May 7, 2020

(65) Prior Publication Data

US 2020/0367225 A1  Nov. 19, 2020

Related U.S. Application Data

(60) Provisional application No. 62/847,194, filed on May 13, 2019.

(51) Int. Cl.
| | |
|---|---|
| *H04W 72/20* | (2023.01) |
| *H04W 4/40* | (2018.01) |
| *H04L 5/00* | (2006.01) |
| *H04W 72/52* | (2023.01) |
| *H04W 72/54* | (2023.01) |

(52) U.S. Cl.
CPC ........... *H04W 72/20* (2023.01); *H04L 5/0044* (2013.01); *H04W 4/40* (2018.02); *H04W 72/52* (2023.01); *H04W 72/54* (2023.01)

(58) Field of Classification Search
CPC ............... H04W 72/0406; H04W 4/40; H04W 72/0486; H04W 72/08; H04W 4/50; H04W 76/28; H04W 4/70; H04W 52/0216; H04W 52/0245; H04W 72/0453; H04W 76/14; H04L 5/0044; Y02D 30/70
See application file for complete search history.

(56) References Cited

U.S. PATENT DOCUMENTS

| | | | |
|---|---|---|---|
| 2020/0107402 A1* | 4/2020 | Di Girolamo | ........ H04W 88/16 |
| 2022/0167422 A1* | 5/2022 | Hakola | ................ H04B 17/327 |

FOREIGN PATENT DOCUMENTS

| | | |
|---|---|---|
| WO | WO-2017023464 A1 | 2/2017 |
| WO | WO-2018125686 A2 | 7/2018 |

OTHER PUBLICATIONS

International Search Report and Written Opinion—PCT/US2020/032088—ISAEPO—dated Jul. 28, 2020.

(Continued)

*Primary Examiner* — Eric Myers
(74) *Attorney, Agent, or Firm* — Nerrie M. Zohn; Holland & Hart LLP

(57) ABSTRACT

Methods, systems, and devices for wireless communications are described. A user equipment (UE) may identify a duty cycle function corresponding to a duty cycle range. In some cases, the UE may determine the duty cycle function based on a congestion metric. The UE may identify a bandwidth allocation for the UE and may determine a duty cycle within the duty cycle range based on the duty cycle function and the bandwidth allocation. In some cases, the UE may identify one or more of the duty cycle function, the congestion metric, the duty cycle range, or the bandwidth allocation based on control signaling from a base station. The UE may transmit a packet within the bandwidth allocation in accordance with the duty cycle.

30 Claims, 16 Drawing Sheets

(56) References Cited

OTHER PUBLICATIONS

Voicu A M., et al., "Survey of Spectrum Sharing for Inter-Technology Coexistence", arxiv.org, Cornell University Library, 201 OLIN Library Cornell University Ithaca, NY 14853, Dec. 22, 2017 (Dec. 22, 2017), XP081326232, 31 Pages, p. 9, Left-Hand Column paragraph 2, paragraph [IV.B], paragraph [V. B5)]-paragraph [V. B6)], tables IV, V.

* cited by examiner

DYNAMIC DUTY CYCLE

CROSS REFERENCE

The present application for patent claims the benefit of U.S. Provisional Patent Application No. 62/847,194 by PAPALEO et al., entitled "DYNAMIC DUTY CYCLE," filed May 13, 2019, assigned to the assignee hereof, and expressly incorporated by reference herein.

BACKGROUND

The following relates generally to wireless communications, and more specifically to dynamic duty cycle.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, intelligent transport systems (ITS) may incorporate UEs. The UEs may operate within a vehicle-to-everything (V2X) network, such as a cellular V2X (CV2X) network. UEs operating within the CV2X network may perform transmissions in a predefined band. Other devices, such as satellites, may also operate within the predefined band. If interference associated with transmissions from the UEs is too high, the interference may affect the other devices' ability to communicate or perform measurements within the predefined band.

SUMMARY

The described techniques relate to improved methods, systems, devices, and apparatuses in accordance with aspects of the present disclosure. Generally, the described techniques provide for a user equipment (UE) that may adjust its duty cycle according to an allocated transmission bandwidth. For instance, a UE may identify a duty cycle function corresponding to a duty cycle range. In some cases, the UE may determine the duty cycle function based on a congestion metric. The UE may identify a bandwidth allocation for the UE and may determine a duty cycle within the duty cycle range based on the duty cycle function and the bandwidth allocation. In some cases, the UE may identify one or more of the duty cycle function, the congestion metric, the duty cycle range, or the bandwidth allocation based on control signaling from a base station. The UE may transmit a packet within the bandwidth allocation in accordance with the duty cycle.

A method of wireless communications by a UE is described. The method may include identifying a duty cycle function corresponding to a duty cycle range, identifying a bandwidth allocation for the UE, determining a duty cycle within the duty cycle range based on the duty cycle function and the bandwidth allocation, and transmitting a packet within the bandwidth allocation in accordance within the duty cycle.

An apparatus for wireless communications by a UE is described. The apparatus may include a processor, memory in electronic communication with the processor, and instructions stored in the memory. The instructions may be executable by the processor to cause the apparatus to identify a duty cycle function corresponding to a duty cycle range, identify a bandwidth allocation for the UE, determine a duty cycle within the duty cycle range based on the duty cycle function and the bandwidth allocation, and transmit a packet within the bandwidth allocation in accordance within the duty cycle.

Another apparatus for wireless communications by a UE is described. The apparatus may include means for identifying a duty cycle function corresponding to a duty cycle range, identifying a bandwidth allocation for the UE, determining a duty cycle within the duty cycle range based on the duty cycle function and the bandwidth allocation, and transmitting a packet within the bandwidth allocation in accordance within the duty cycle.

A non-transitory computer-readable medium storing code for wireless communications by a UE is described. The code may include instructions executable by a processor to identify a duty cycle function corresponding to a duty cycle range, identify a bandwidth allocation for the UE, determine a duty cycle within the duty cycle range based on the duty cycle function and the bandwidth allocation, and transmit a packet within the bandwidth allocation in accordance within the duty cycle.

In some examples of the method, apparatuses, and non-transitory computer-readable medium described herein, identifying the duty cycle function may include operations, features, means, or instructions for receiving control signaling indicating the duty cycle function from a set of different duty cycle functions.

In some examples of the method, apparatuses, and non-transitory computer-readable medium described herein, identifying the duty cycle function may include operations, features, means, or instructions for retrieving the duty cycle function from a storage device of the UE.

In some examples of the method, apparatuses, and non-transitory computer-readable medium described herein, identifying the duty cycle function may include operations, features, means, or instructions for selecting the duty cycle function from a set of different duty cycle functions based on a congestion metric.

In some examples of the method, apparatuses, and non-transitory computer-readable medium described herein, the congestion metric may be generated based on a signal measurement, a reference signal received power measurement, a reference signal received quality measurement, a received signal strength indicator, or any combination thereof.

Some examples of the method, apparatuses, and non-transitory computer-readable medium described herein may further include operations, features, means, or instructions for performing measurements over a time window to generate the congestion metric.

Some examples of the method, apparatuses, and non-transitory computer-readable medium described herein may further include operations, features, means, or instructions for monitoring the bandwidth allocation over a time window to determine the congestion metric.

Some examples of the method, apparatuses, and non-transitory computer-readable medium described herein may further include operations, features, means, or instructions for receiving control signaling indicating the congestion metric.

In some examples of the method, apparatuses, and non-transitory computer-readable medium described herein, the duty cycle function may be a linear function over the bandwidth allocation, a non-linear function over the bandwidth allocation, a piecewise linear function over the bandwidth allocation, an exponential function over the bandwidth allocation, a step function over the bandwidth allocation, a constant value over the bandwidth allocation, or a hyperbolic tangent (tanh) function over the bandwidth allocation.

In some examples of the method, apparatuses, and non-transitory computer-readable medium described herein, transmitting the packet may include operations, features, means, or instructions for adjusting a transmission rate based on the duty cycle, and transmitting the packet based on the adjusted transmission rate.

Some examples of the method, apparatuses, and non-transitory computer-readable medium described herein may further include operations, features, means, or instructions for adjusting a number of repetitions of the packet based on the duty cycle, and transmitting repetitions of the packet based on the adjusted number of repetitions.

Some examples of the method, apparatuses, and non-transitory computer-readable medium described herein may further include operations, features, means, or instructions for receiving control signaling indicating the duty cycle range.

In some examples of the method, apparatuses, and non-transitory computer-readable medium described herein, receiving the control signaling may include operations, features, means, or instructions for receiving control signaling indicating a maximum duty cycle and a minimum duty cycle within the duty cycle range.

In some examples of the method, apparatuses, and non-transitory computer-readable medium described herein, identifying the bandwidth allocation may include operations, features, means, or instructions for receiving control signaling indicating the bandwidth allocation.

In some examples of the method, apparatuses, and non-transitory computer-readable medium described herein, transmitting the packet may include operations, features, means, or instructions for transmitting the packet to one or more of a base station or a second UE.

In some examples of the method, apparatuses, and non-transitory computer-readable medium described herein, transmitting the packet may include operations, features, means, or instructions for broadcasting the packet to one or more of a base station or at least one additional UE.

In some examples of the method, apparatuses, and non-transitory computer-readable medium described herein, transmitting the packet may include operations, features, means, or instructions for transmitting the packet to one or more of a base station or at least one additional UE in a vehicle to everything (V2X) system.

A method of wireless communications by a base station or a wireless entity is described. The method may include configuring a UE with a duty cycle function corresponding to a duty cycle range, configuring the UE with a bandwidth allocation, determining a duty cycle within the duty cycle range based on the duty cycle function and the bandwidth allocation, and monitoring for a packet transmitted by the UE within the bandwidth allocation in accordance within the duty cycle.

An apparatus for wireless communications by a base station or a wireless entity is described. The apparatus may include a processor, memory in electronic communication with the processor, and instructions stored in the memory. The instructions may be executable by the processor to cause the apparatus to configure a UE with a duty cycle function corresponding to a duty cycle range, configure the UE with a bandwidth allocation, determine a duty cycle within the duty cycle range based on the duty cycle function and the bandwidth allocation, and monitor for a packet transmitted by the UE within the bandwidth allocation in accordance within the duty cycle.

Another apparatus for wireless communications by a base station or a wireless entity is described. The apparatus may include means for configuring a UE with a duty cycle function corresponding to a duty cycle range, configuring the UE with a bandwidth allocation, determining a duty cycle within the duty cycle range based on the duty cycle function and the bandwidth allocation, and monitoring for a packet transmitted by the UE within the bandwidth allocation in accordance within the duty cycle.

A non-transitory computer-readable medium storing code for wireless communications by a base station or a wireless entity is described. The code may include instructions executable by a processor to configure a UE with a duty cycle function corresponding to a duty cycle range, configure the UE with a bandwidth allocation, determine a duty cycle within the duty cycle range based on the duty cycle function and the bandwidth allocation, and monitor for a packet transmitted by the UE within the bandwidth allocation in accordance within the duty cycle.

In some examples of the method, apparatuses, and non-transitory computer-readable medium described herein, configuring the UE with the duty cycle function may include operations, features, means, or instructions for transmitting control signaling indicating the duty cycle function from a set of different duty cycle functions.

Some examples of the method, apparatuses, and non-transitory computer-readable medium described herein may further include operations, features, means, or instructions for selecting the duty cycle function from a set of different duty cycle functions based on a congestion metric.

In some examples of the method, apparatuses, and non-transitory computer-readable medium described herein, the congestion metric may be generated based on a signal measurement, a reference signal received power measurement, a reference signal received quality measurement, a received signal strength indicator, or any combination thereof.

Some examples of the method, apparatuses, and non-transitory computer-readable medium described herein may further include operations, features, means, or instructions for monitoring the bandwidth allocation over a time window to determine a congestion metric.

Some examples of the method, apparatuses, and non-transitory computer-readable medium described herein may further include operations, features, means, or instructions for transmitting control signaling indicating the congestion metric.

In some examples of the method, apparatuses, and non-transitory computer-readable medium described herein, the duty cycle function may be a linear function over the bandwidth allocation, a non-linear function linear function over the bandwidth allocation, a piecewise linear function over the bandwidth allocation, an exponential function over the bandwidth allocation, a step function over the bandwidth allocation, a constant value over the bandwidth allocation, or a tanh function over the bandwidth allocation.

In some examples of the method, apparatuses, and non-transitory computer-readable medium described herein, monitoring for the packet may include operations, features, means, or instructions for adjusting a transmission rate based on the duty cycle, and monitoring for the packet based on the adjusted transmission rate.

Some examples of the method, apparatuses, and non-transitory computer-readable medium described herein may further include operations, features, means, or instructions for adjusting a number of repetitions of the packet based on the duty cycle, and monitoring for repetitions of the packet based on the adjusted number of repetitions.

Some examples of the method, apparatuses, and non-transitory computer-readable medium described herein may further include operations, features, means, or instructions for transmitting control signaling indicating the duty cycle range.

In some examples of the method, apparatuses, and non-transitory computer-readable medium described herein, transmitting the control signaling may include operations, features, means, or instructions for transmitting control signaling indicating a maximum duty cycle and a minimum duty cycle within the duty cycle range.

Some examples of the method, apparatuses, and non-transitory computer-readable medium described herein may further include operations, features, means, or instructions for transmitting control signaling indicating the bandwidth allocation.

DETAILED DESCRIPTION

Figure 1:
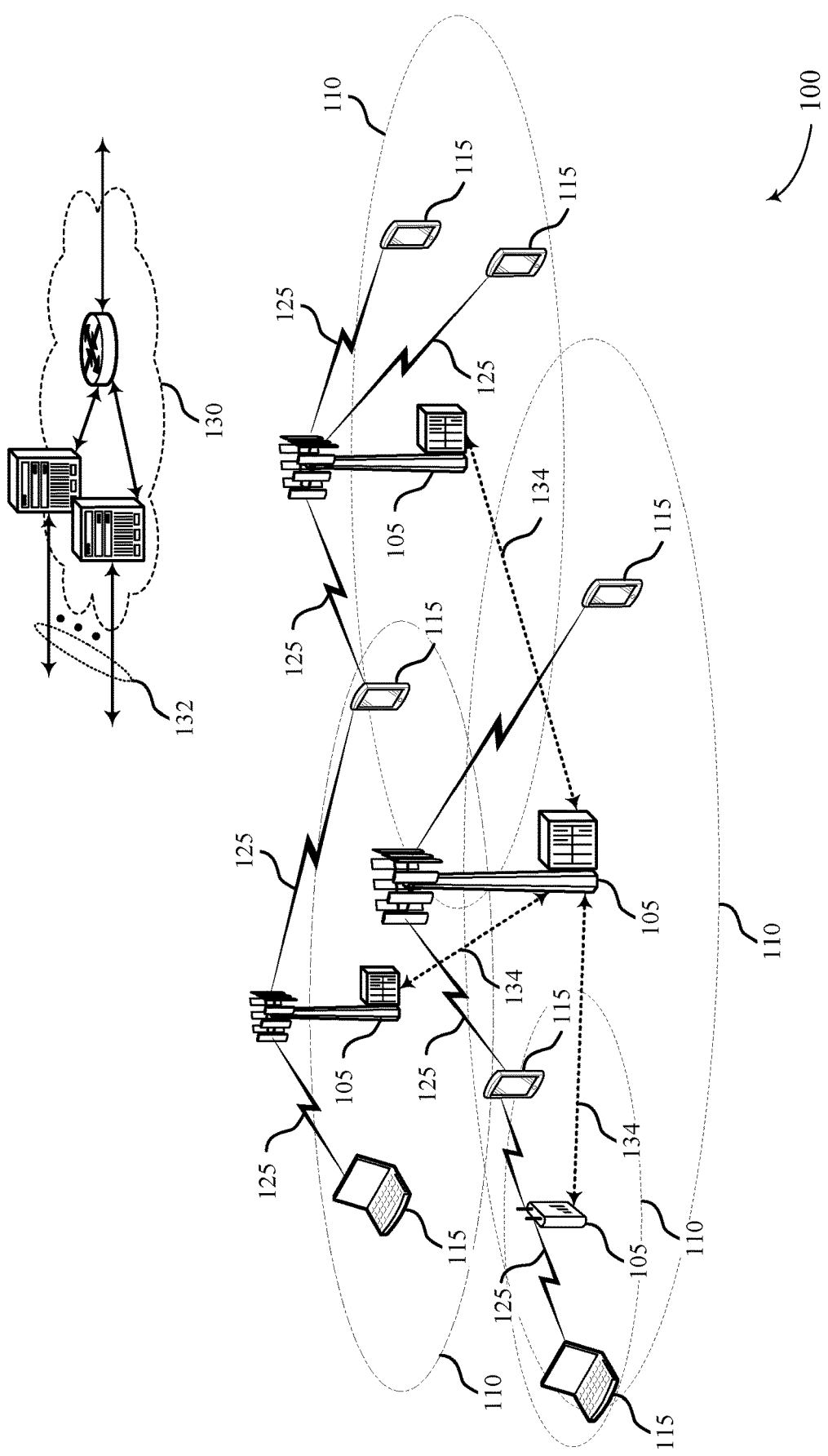
FIG. 1 illustrates an example of a wireless communications system in accordance with aspects of the present disclosure.

In some cases, a user equipment (UE) may perform transmissions according to a duty cycle, which may be a fraction of a time window during which the UE is active. Typically, the duty cycle may be defined as a fixed value over the time window. However, defining a fixed value for a duty cycle for a V2X transmission, which may have a lower bandwidth allocation (e.g., fewer resource blocks) compared to an allocated channel, may promote ineffective communications. For instance, assuming that a UE with a reduced bandwidth allocation and a UE with a full bandwidth allocation have the same duty cycle, the UE with the reduced bandwidth allocation may have fewer available resources to transmit over compared to the UE with the full bandwidth allocation.

In general, a UE may account for a constraint on allocated channel power (e.g., a power spectral density (PSD) constraint) when determining a transmission power. UEs with a reduced bandwidth allocation may transmit with a reduced power compared to a UE with a bandwidth allocation spanning the full bandwidth of the allocated channel. As such, assuming that both UEs are transmitting with the same duty cycle, the UE with the reduced bandwidth allocation may transmit less energy over a time window than a UE with the full bandwidth allocation. In general, victim devices may have constraints based on a total energy over time and frequency resources. Thus, assuming that the UE with the full bandwidth allocation satisfies the energy constraints of the victim device, the UE with the reduced bandwidth allocation may also satisfy the energy constraints of the victim device. As such, the UE with the reduced allocation may potentially increase the total energy of a transmission to at least that of a transmission from the UE with the full bandwidth allocation without violating the energy constraints of the victim device.

In some cases, increasing the energy for a transmission from a UE with a reduced bandwidth allocation may enable the UE to perform more effective communications. For instance, increasing a maximum allowed duty cycle for a transmission from the UE may increase energy associated with the transmission and may also enable the UE to gain access to a greater number of available resources. Additionally, increasing the maximum allowed duty cycle may not increase the power. As such, the UE may avoid potentially violating the constraint on the allocated channel power when increasing energy. To determine a maximum duty cycle value to which the duty cycle may be set, the UE with a reduced allocation may use a relationship (e.g., a function) between the maximum duty cycle and the transmission bandwidth size of the bandwidth allocation. In some cases, the function that a UE uses may depend on a congestion metric.

Aspects of the disclosure are initially described in the context of a wireless communications system. Additional aspects of the disclosure may be described with reference to an additional wireless communications system, a maximum duty cycle determination scheme, and a process flow. Aspects of the disclosure are further illustrated by and described with reference to apparatus diagrams, system diagrams, and flowcharts.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, a wireless communications entity, a wireless entity, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may identify a duty cycle function corresponding to a duty cycle range. In some cases, the UE 115 may determine the duty cycle function based on a congestion metric. The UE 115 may identify a bandwidth allocation for the UE 115 and may determine a duty cycle within the duty cycle range based on the duty cycle function and the bandwidth allocation. In some cases, the UE 115 may identify one or more of the duty cycle function, the congestion metric, the duty cycle range, or the bandwidth allocation based on control signaling from a base station. The UE 115 may transmit a packet within the bandwidth allocation in accordance with the duty cycle.

The methods described herein may one or more potential advantages. For instance, adjusting the duty cycle according to transmission bandwidth may enable a transmitting UE 115 to have an increased number of available resources over which to send transmissions without violating an energy constraint of a victim device. Additionally or alternatively, adjusting the duty cycle according to transmission bandwidth may ensure that a UE 115 does not transmit a transmission with too much energy when as bandwidth approaches a higher value.

Figure 2:
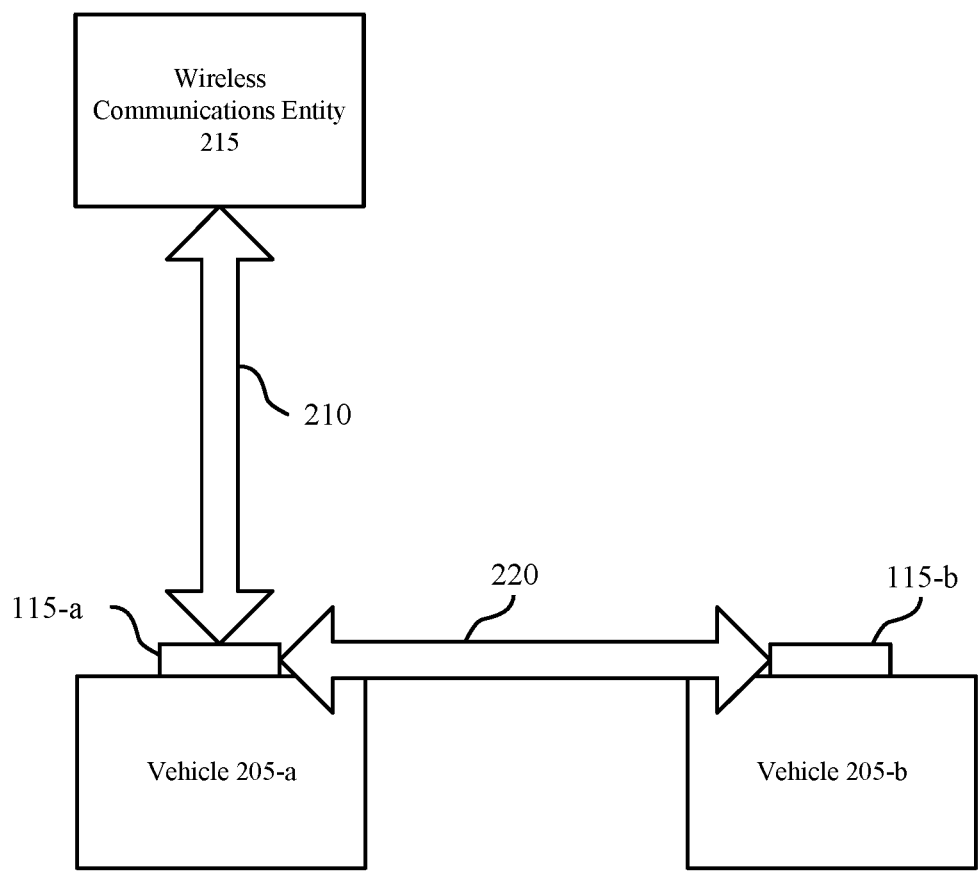
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communication system 100. For instance, wireless communications system may include UE 115-a, which may be an example of a UE 115 as described with reference to FIG. 1.

Vehicle 205-a may include a UE 115-a which may participate in V2X communication (e.g., over communication link 210 with wireless communications entity 215). Such communication may include vehicle-to-infrastructure (V2I) communication, vehicle-to-network (V2N) communication, vehicle-to-vehicle (V2V) communication, vehicle-to-pedestrian (V2P) communication, vehicle-to-device (V2D) communication, and vehicle-to-grid (V2G) communication, among other types of communication. Wireless communications entity 215 may, correspondingly, be an infrastructure entity, a network entity (e.g., a base station 105 or UE 115), another vehicle 205, a pedestrian entity, a device entity, or a grid entity, among other types of entities. UE 115-a may be a V2X UE 115, a handheld UE 115, a WLL station, an MTC device, an IoT device, an IoE device, or the like. In some cases (e.g., if UE 115-a is a V2X UE 115), UE 115-a may be mounted, integrated, or otherwise attached to vehicle 205-a.

UE 115-a may communicate over communication link 220 with UE 115-b. UE 115-b may be a V2X UE 115, a handheld UE 115, a WLL station, an MTC device, an IoT device, and IoE device, or the like. In some cases (e.g., if UE 115-b is a V2X UE 115), UE 115-b may be mounted, integrated, or otherwise attached to vehicle 205-b. In some examples, UE 115-a may broadcast a transmission to UE 115-b and one or more other UEs 115. The one or more other UEs 115 may be V2X UEs 115, handheld UEs 115, WLL stations, MTC devices, IoT devices, IoE devices, or a combination of these. UEs 115 that are V2X UEs 115 may be mounted, integrated, or otherwise attached to respective vehicles 205.

In some cases, road ITS technologies (e.g., ITS-G5 or CV2X), such as vehicle 205-a and UE 115-a, may operate in a 5.9 gigahertz (GHz) band and may have an associated duty cycle constraint. The duty cycle constraint may protect other services (e.g., fixed satellite services (FSS)) from cumulative interference from road ITS technologies. An enhancement of the duty cycle constraint to adjust the duty cycle based on the actual transmission bandwidth may enable enhanced communications.

The duty cycle may be defined as a ratio, expressed as a percentage, of the maximum transmitter "on" time monitored over a time window (e.g., one second), relative to a time window period (e.g., a measurement period). For example, the duty cycle may be expressed as a percentage of the transmitter total "on" time on a carrier frequency relative to a one second period. Typically, the duty cycle may be defined as a fixed value (e.g., 10%) over the time window (e.g., a 1-second time window). However, defining a single value for duty cycle for a V2X transmission from UE 115-a, which may have a lower bandwidth allocation (e.g., fewer resource blocks) compared to an allocated channel (e.g., a 10 MHz channel), may lead to a variety of disadvantages. For instance, a wireless device operating in a 5.9 GHz band (e.g., UE 115-a) may operate according to a power spectral density (PSD) constraint (e.g., no more than 23 dBm/MHz and a maximum total allowed power of 33 dBM for a 10 MHz channel). As such, transmissions from UE 115-a associated with a reduced frequency or bandwidth allocation (e.g., limited number of RBs) may have a reduced transmit power compared to the maximum total allowed power (e.g., 33 dBm). For instance, if UE 115-a has a bandwidth allocation spanning half of a channel (e.g., 5 MHz) and another UE 115 has a bandwidth allocation spanning the other half of the channel (e.g., 5 MHz), both UEs 115 may not transmit at the maximum total allowed power (e.g., 33 dBm), as the total power of transmissions from the two devices may exceed the maximum total allowed power for the channel. As such, UE 115-a and the other UE 115 may transmit at reduced transmit powers. However, if a bandwidth allocation of UE 115-a spans the entire channel (e.g., 10 MHz), UE 115-a may transmit at the maximum total allowed power (e.g., 33 dBm).

If a same duty cycle is adopted for a reduced bandwidth allocation as for a full bandwidth allocation, a total amount of available resources (e.g., in terms of frequency and time) may be reduced for the reduced bandwidth allocation. For instance, if a 10% duty cycle is used for a 5 MHz bandwidth allocation, the total bandwidth allocation may span M time resource lengths (e.g., symbol periods) and N frequency resource lengths (e.g., sub-bands, sub-carriers, or bandwidth parts), which may correspond to M*N total potentially available resources. If a 10% duty cycle is used for a 10 MHz bandwidth allocation, meanwhile, the total bandwidth allocation may span M time resource lengths and 2N frequency resource lengths, which may correspond to M*2N total potentially available resources. As such, the 10 MHz bandwidth allocation with the 10% duty cycle may have more potentially available resources (e.g., twice as many) than the 5 MHz bandwidth allocation with the 10% duty cycle.

The loss of available resources may be mitigated by adjusting the maximum duty cycle according to the allocation bandwidth. By increasing the maximum duty cycle as bandwidth decreases, UE 115-a may gain an amount of time resources which may at least partially mitigate the amount of frequency resources being lost. Additionally, from a victim satellite perspective, what may matter in performing communications or measurements is the total amount of interference across time and frequency (e.g., a total amount of energy from interference). As such, scaling the duty cycle may not introduce additional interference. For instance, as mentioned above, if UE 115-a has a reduced bandwidth allocation, UE 115-*a* may transmit at a reduced power. As such, an amount of energy transmitted over a given time duration (e.g., a symbol) by UE 115-*a* when UE 115-*a* has a full-bandwidth allocation (e.g., 10 MHz) may be greater than an amount of energy transmitted by UE 115-*a* when UE 115-*a* has a partial-bandwidth allocation (5 MHz). Thus, the duty cycle of UE 115-*a* when UE 115-*a* has the partial-bandwidth allocation may be scaled such that an energy transmitted by UE 115-*a* over a duty cycle period is equal to or still less than the energy transmitted by UE 115-*a* when UE 115-*a* has the full-bandwidth allocation.

Figure 3:
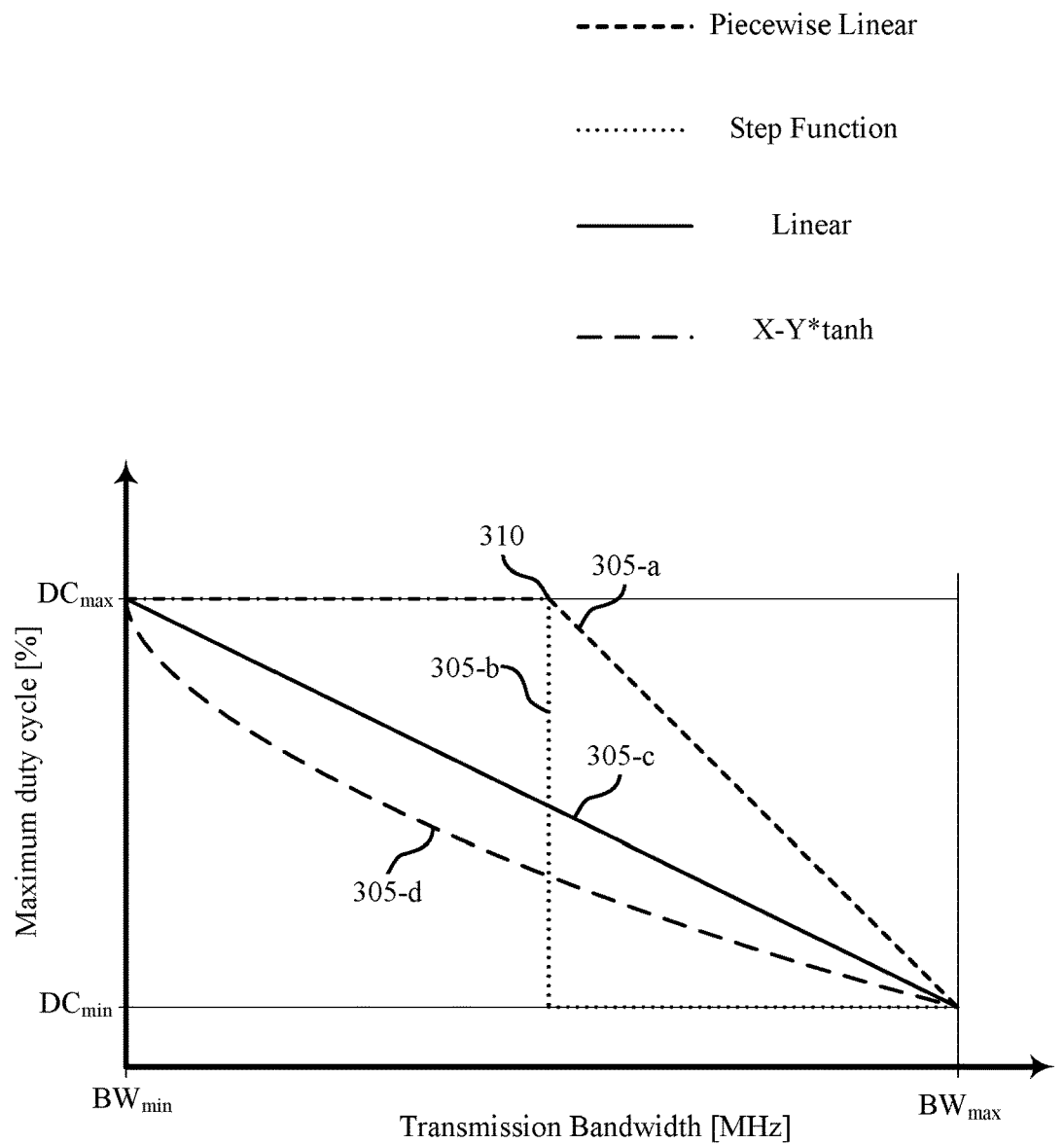
FIG. 3 illustrates an example of a maximum duty cycle determination scheme in accordance with aspects of the present disclosure.

FIG. 3 illustrates an example of a maximum duty cycle determination scheme 300 in accordance with aspects of the present disclosure. In some examples, maximum duty cycle determination scheme 300 may be implemented by aspects of wireless communication system 100. For instance, maximum duty cycle determination scheme 300 may be implemented by a UE 115 or a base station 105 as described with reference to FIG. 1.

As mentioned above, the duty cycle for a transmission from a wireless device may be adjusted in accordance with the transmission bandwidth of the bandwidth allocation. At a minimum bound (i.e., BWmin) of the transmission bandwidth, the maximum duty cycle may be at a maximum (i.e., DCmax) and at a maximum bound (i.e., BWmax) of the transmission bandwidth, the maximum duty cycle may be at a minimum (DCmin). In one example, DCmin may be equal to 6% and DCmax may be equal to 10%.

For a transmission bandwidth between BWmin and BWmax, the maximum duty cycle may be adjusted with a function of transmission bandwidth. The function may, for instance, be a piecewise linear function (e.g., curve 305-*a*), a step function (e.g., curve 305-*b*), a linear function (e.g., curve 305-*c*), a hyperbolic tangent (i.e., tanh) function (e.g., curve 305-*d*), an exponential function, an arctan function, or another function. In general, the actual duty cycle the transmitting device may use may be below the value defined by the selected curve (e.g., below the maximum duty cycle value for a particular bandwidth). That is, the duty cycle limit may not exceed the limit duty cycle when measured over a measurement period of the time window (e.g., 1 second).

In one example, the maximum duty cycle may be defined as:

$$DC [\%] = \min(DCmax - 0.8*(BWtx-5) + DCmin) \quad (1)$$

where BWtx may be a bandwidth size of a bandwidth allocation.

In another example, the maximum duty cycle may be defined as:

$$DC [\%] = DCmax \text{ for } BWtx < 5 \text{ MHz}, DCmin \text{ otherwise} \quad (2)$$

In another example, such as for the piecewise linear function (e.g., curve 305-*a*), a determination for the duty cycle may vary between the maximum duty cycle and the minimum duty cycle. For example, between the minimum bandwidth and a point 310, the duty cycle may be the maximum bandwidth. Between the point 310 and the maximum bandwidth, the duty cycle may be determined according to a function (e.g., a linear function).

In general, different functions may be used in different traffic or deployment situations. For instance, in a high traffic situation, a more conservative function may be used, which may have a lower allowed or maximum duty cycle. For example, the UE 115 may monitor a signal measurement (e.g., a reference signal received quality measurement) over a time window and identify a high traffic situation if the signal metric does not satisfy a threshold (e.g., reference signal received quality measurement falls below a threshold). If there is lower traffic, a more aggressive function may be adopted. For example, the UE 115 may monitor a signal measurement (e.g., a reference signal received power measurement) over a time window and identify a high traffic situation if the signal metric satisfies a threshold (e.g., reference signal received power meets or exceeds a threshold). In general, a first function may be more conservative for a given transmission bandwidth than a second function if the first function has a lower maximum duty cycle value than the second function for that transmission bandwidth.

Additionally, the wireless device (e.g., a UE 115) may configure a different function based on a perceived traffic condition. For instance, the duty cycle scaling function may be selected dynamically based on currently observed congestion conditions (e.g., to check a wireless transmission resource that may be used by other UEs and/or other wireless devices). Determining traffic conditions may involve a signal measurement, a reference signal received power measurement, a reference signal received quality measurement, a received signal strength measurement, or the like, or a combination thereof. Based on one or more of these measurements, the wireless device may generate a congestion metric.

Figure 4:
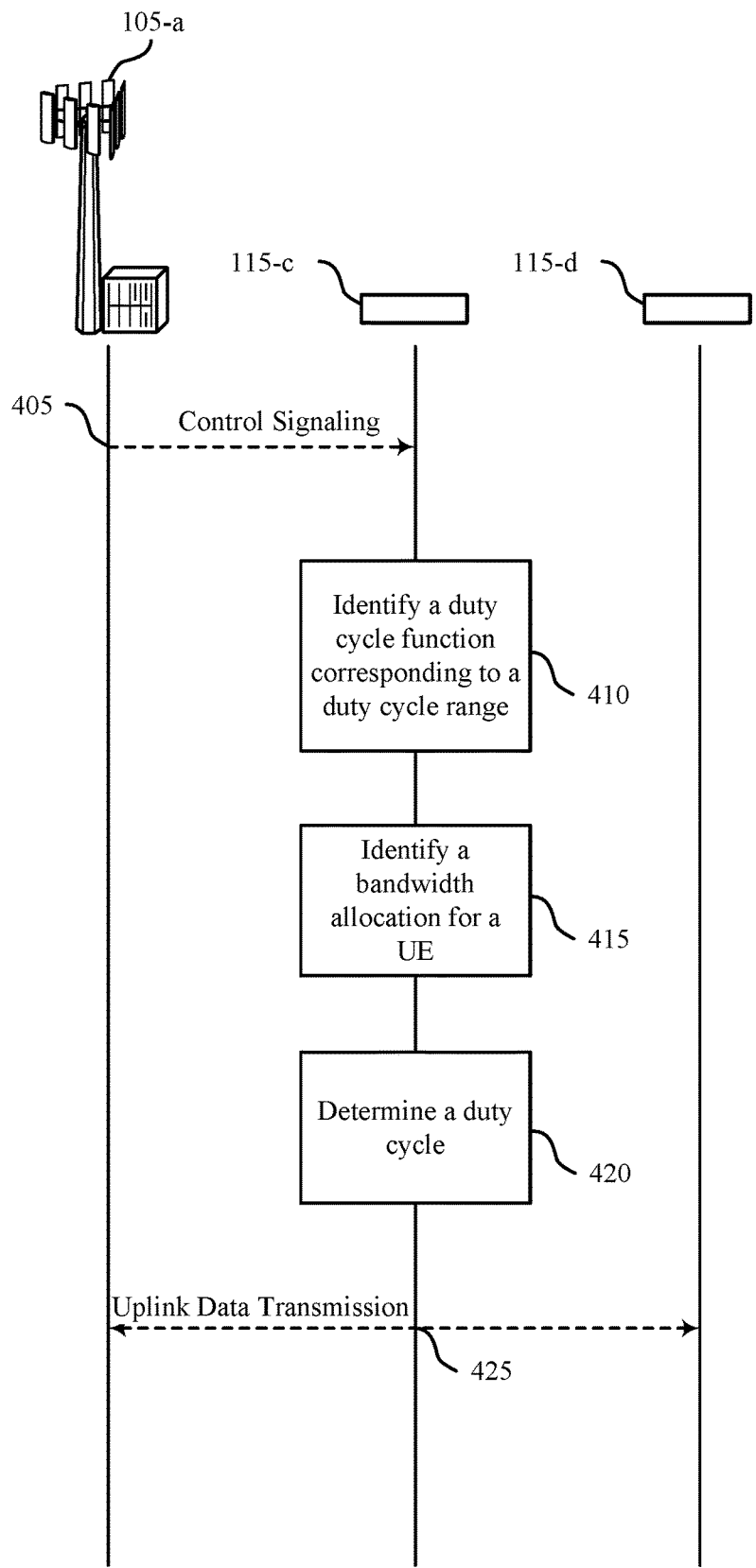
FIG. 4 illustrates an example of a process flow in accordance with aspects of the present disclosure.

FIG. 4 illustrates an example of a process flow 400 in accordance with aspects of the present disclosure. In some examples, process flow 400 may be implemented by aspects of wireless communication system 100. For instance, base station 105-*a* may be an example of a base station 105 as described with reference to FIG. 1 and UEs 115-*c* and 115-*d* may be examples of UEs 115 as described with reference to FIG. 1. In some cases, base station 105-*a* may be an example of a wireless entity, such as a wireless communications entity 215, described with reference to FIG. 2.

At 405, base station 105-*a* may transmit control signaling. The control signaling may indicate a duty cycle function from a set of different duty cycle functions (e.g., a linear function, a non-linear function, a piece-wise linear function, an exponential function, a step function, a constant value, or a tanh function). In some cases, base station 105-*a* may select the duty cycle from the set of different duty cycle functions based on a congestion metric. Additionally or alternatively, the control signaling may indicate the congestion metric. The congestion metric may be generated based on a signal measurement, a reference signal received power measurement, a reference signal received quality measurement, a received signal strength measurement, or a combination thereof. The congestion metric may be determined by monitoring a bandwidth allocation over a time window. Additionally or alternatively, the control signaling may indicate a duty cycle range. In some cases, the control signaling may indicate a maximum duty cycle and a minimum duty cycle within the duty cycle range. Additionally or alternatively, the control signaling may indicate the bandwidth allocation. UE 115-*c* may receive the control signaling. It should be noted that the indication of the duty cycle function, the indication of the congestion metric, the indication of the duty cycle range, the indication of the maximum and minimum duty cycles, and the indication of the bandwidth allocation may each be sent in a same instance of control signaling or may be sent in different instances.

At 410, UE 115-*c* may identify a duty cycle function corresponding to a duty cycle range. In one example, the duty cycle function or the duty cycle range may be indicated by base station 105-*a* (e.g., at 405). Alternatively, UE 115-*c* may select the duty cycle function from a set of different duty cycle functions based on a congestion metric. Additionally or alternatively, UE 115-*c* may retrieve the duty cycle function from a storage device of UE 115-*c*. In some cases, the congestion metric may be indicated by base station 105-*a* (e.g., at 405).

At 415, UE 115-*c* may identify a bandwidth allocation. Identifying the bandwidth allocation may involve receiving control signaling from base station 105-*a* (e.g., at 405). In some cases, 415 may occur prior to 410.

At 420, UE 115-*c* may determine a duty cycle within the duty cycle range based on the duty cycle function and the bandwidth allocation.

At 425, UE 115-*c* may transmit a packet within the bandwidth allocation in accordance with the duty cycle. In some cases, transmitting the packet may involve adjusting a transmission rate based on the duty cycle and transmitting the packet based on the adjusted transmission rate. UE 115-*c* may transmit the packet to base station 105-*a* or UE 115-*d*. Base station 105-*a* or UE 115-*d* may receive the packet. In some cases, UE 115-*c* may adjust a number of repetitions of the packet based on the duty cycle and may transmit the repetitions of the packet based on the adjusted number of repetitions. In some cases, UE 115-*c* may broadcast the packet to one or more of base station 105-*a* or at least one additional UE 115. In some cases, transmitting the packet to one or more of base station 105-*a* or at least one additional UE 115 in a V2X system. the base station may monitor for and receive the packet from UE 115 within the bandwidth allocation.

Figure 5:
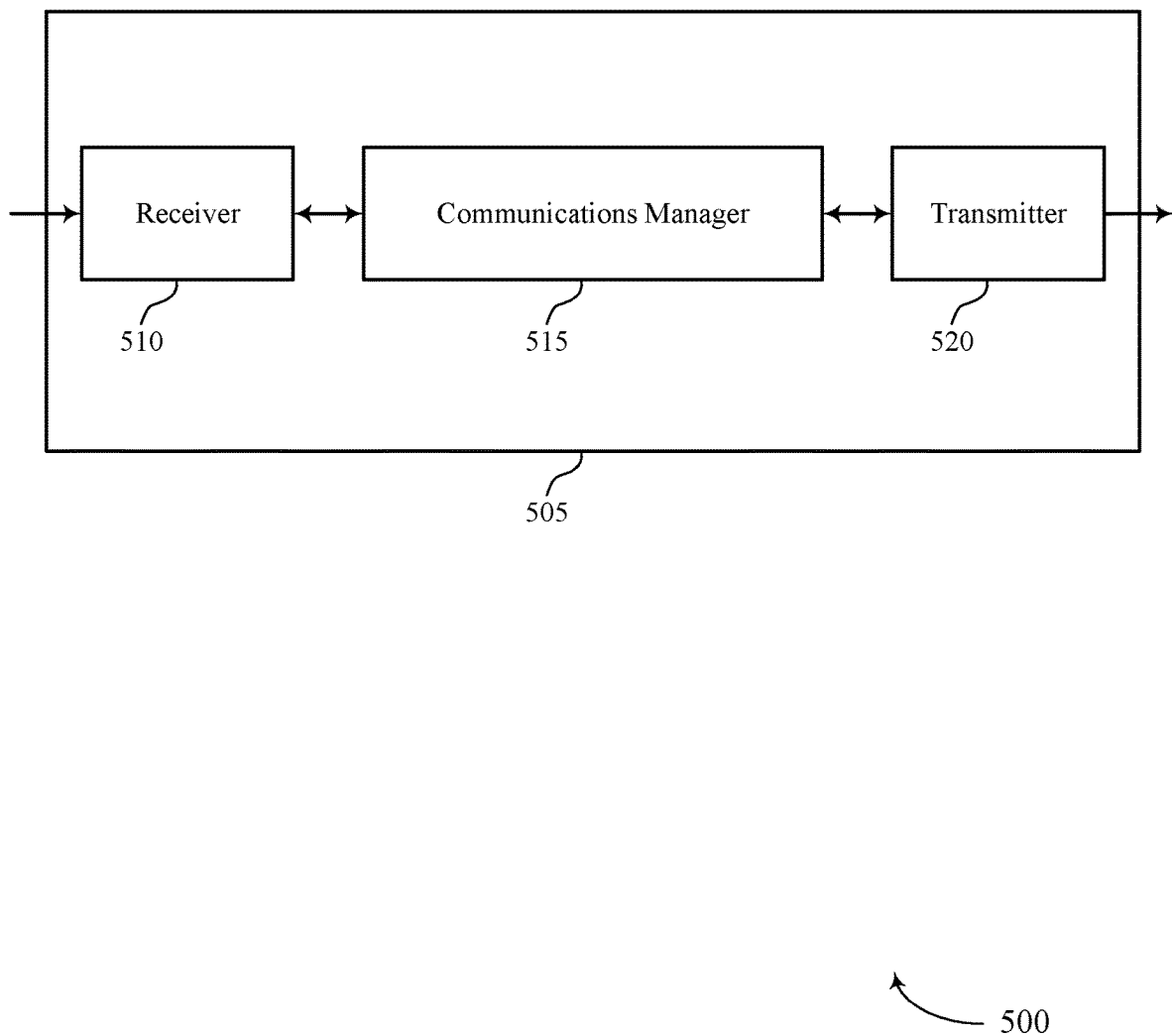
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to a dynamic duty cycle, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a duty cycle function corresponding to a duty cycle range, identify a bandwidth allocation for the UE, determine a duty cycle within the duty cycle range based on the duty cycle function and the bandwidth allocation, and transmit a packet within the bandwidth allocation in accordance within the duty cycle. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
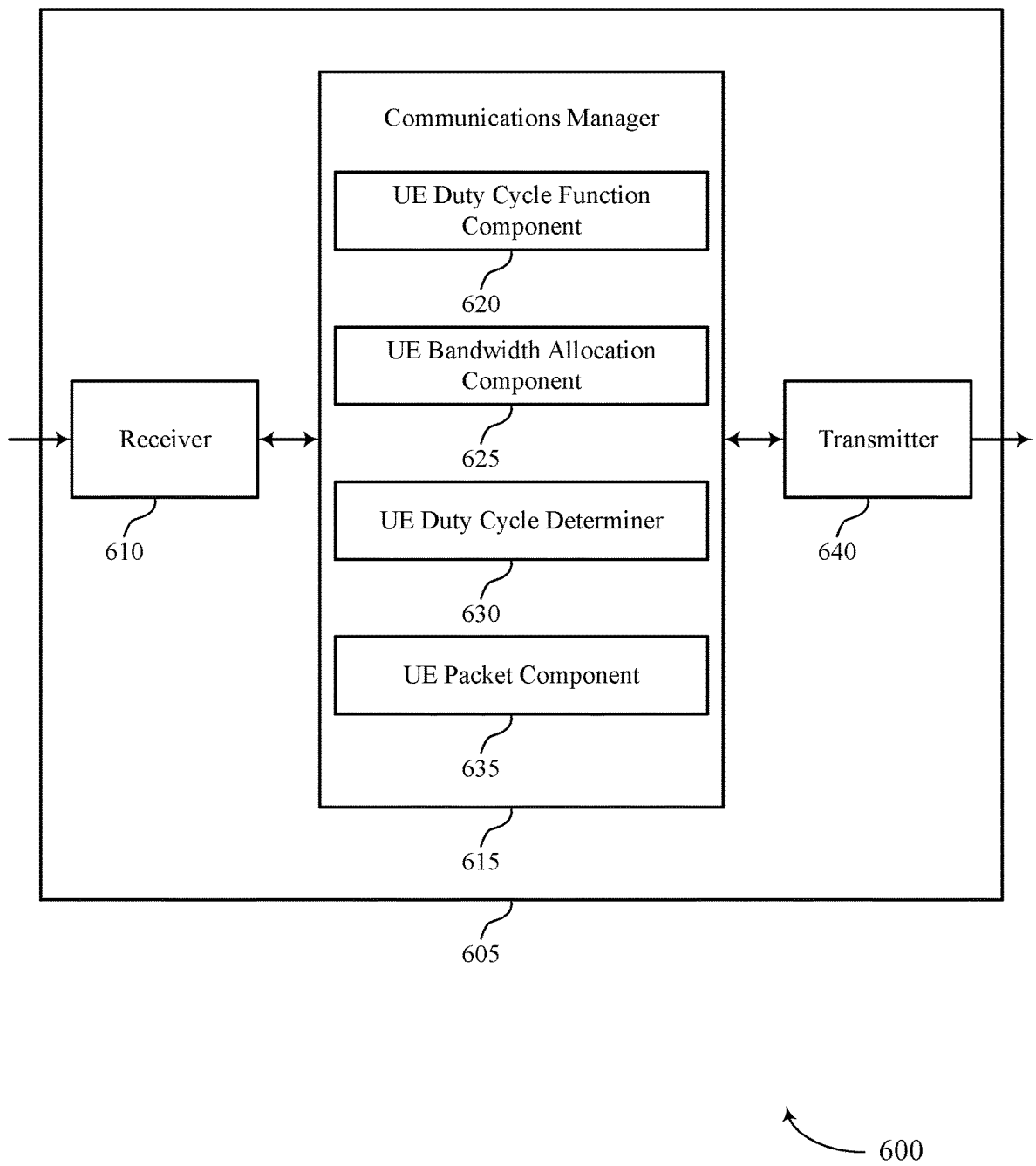

FIG. 6 shows a block diagram 600 of a device 605 in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to dynamic duty cycle, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a UE duty cycle function component 620, a UE bandwidth allocation component 625, a UE duty cycle determiner 630, and a UE packet component 635. The communications manager 615 may be an example of aspects of the communications manager 810 described herein. The actions performed by the communications manager 615 as described herein may be implemented to realize one or more potential advantages. One implementation may allow a UE to have a greater assortment of available resources over which the UE may transmit, which may increase a likelihood that a receiving device may receive the transmission. As such, the implementation may lower an amount of times a UE may perform a retransmission.

The UE duty cycle function component 620 may identify a duty cycle function corresponding to a duty cycle range.

The UE bandwidth allocation component 625 may identify a bandwidth allocation for the UE.

The UE duty cycle determiner 630 may determine a duty cycle within the duty cycle range based on the duty cycle function and the bandwidth allocation.

The UE packet component 635 may transmit a packet within the bandwidth allocation in accordance within the duty cycle.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
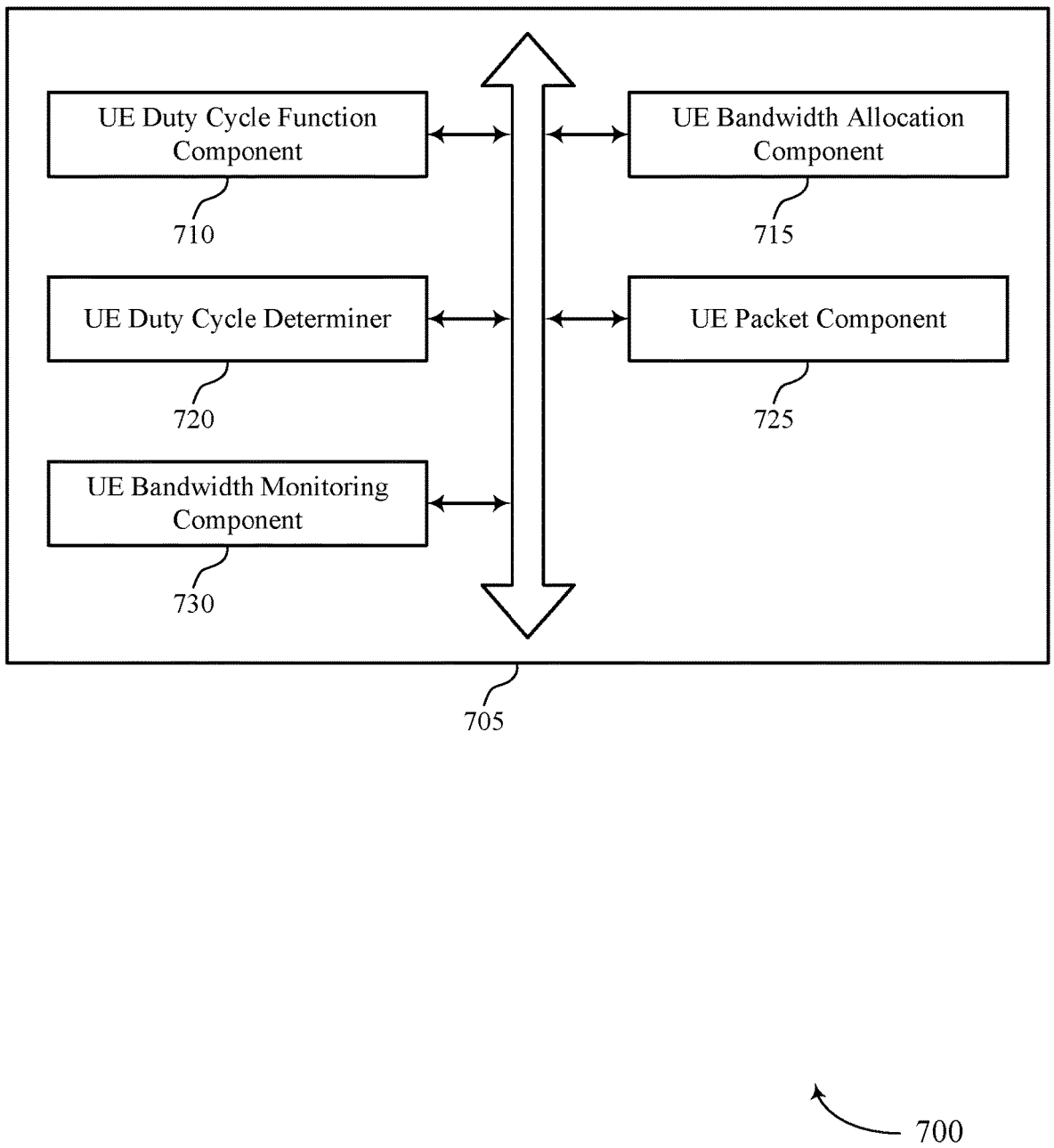
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include a UE duty cycle function component 710, a UE bandwidth allocation component 715, a UE duty cycle determiner 720, a UE packet component 725, and a UE bandwidth monitoring component 730. Each of these modules may communicate, directly or indirectly, with one another (e.g., via one or more buses).

The UE duty cycle function component 710 may identify a duty cycle function corresponding to a duty cycle range. In some examples, the UE duty cycle function component 710 may receive control signaling indicating the duty cycle function from a set of different duty cycle functions. In some examples, the UE duty cycle function component 710 may retrieve the duty cycle function from a storage device of the UE. In some examples, the UE duty cycle function component 710 may select the duty cycle function from a set of different duty cycle functions based on a congestion metric. In some examples, the UE duty cycle function component 710 may perform measurements over a time window to generate the congestion metric. In some examples, the UE duty cycle function component 710 may receive control signaling indicating the congestion metric. In some cases, the congestion metric is generated based on a signal measurement, a reference signal received power measurement, a reference signal received quality measurement, a received signal strength indicator, or any combination thereof. In some cases, the duty cycle function is a linear function over the bandwidth allocation, a non-linear function over the bandwidth allocation, a piecewise linear function over the bandwidth allocation, an exponential function over the bandwidth allocation, a step function over the bandwidth allocation, a constant value over the bandwidth allocation, or a tanh function over the bandwidth allocation.

The UE bandwidth allocation component 715 may identify a bandwidth allocation for the UE. In some examples, the UE bandwidth allocation component 715 may receive control signaling indicating the bandwidth allocation.

The UE duty cycle determiner 720 may determine a duty cycle within the duty cycle range based on the duty cycle function and the bandwidth allocation. In some examples, the UE duty cycle determiner 720 may receive control signaling indicating the duty cycle range. In some examples, the UE duty cycle determiner 720 may receive control signaling indicating a maximum duty cycle and a minimum duty cycle within the duty cycle range.

The UE packet component 725 may transmit a packet within the bandwidth allocation in accordance within the duty cycle. In some examples, the UE packet component 725 may adjust a transmission rate based on the duty cycle. In some examples, the UE packet component 725 may transmit the packet based on the adjusted transmission rate. In some examples, the UE packet component 725 may adjust a number of repetitions of the packet based on the duty cycle. In some examples, the UE packet component 725 may transmit repetitions of the packet based on the adjusted number of repetitions. In some examples, the UE packet component 725 may transmit the packet to one or more of a base station or a second UE. In some examples, the UE packet component 725 may broadcast the packet to one or more of a base station or at least one additional UE. In some examples, the UE packet component 725 may transmit the packet to one or more of a base station or at least one additional UE in a vehicle to everything (V2X) system.

The UE bandwidth monitoring component 730 may monitor the bandwidth allocation over a time window to determine the congestion metric.

Figure 8:
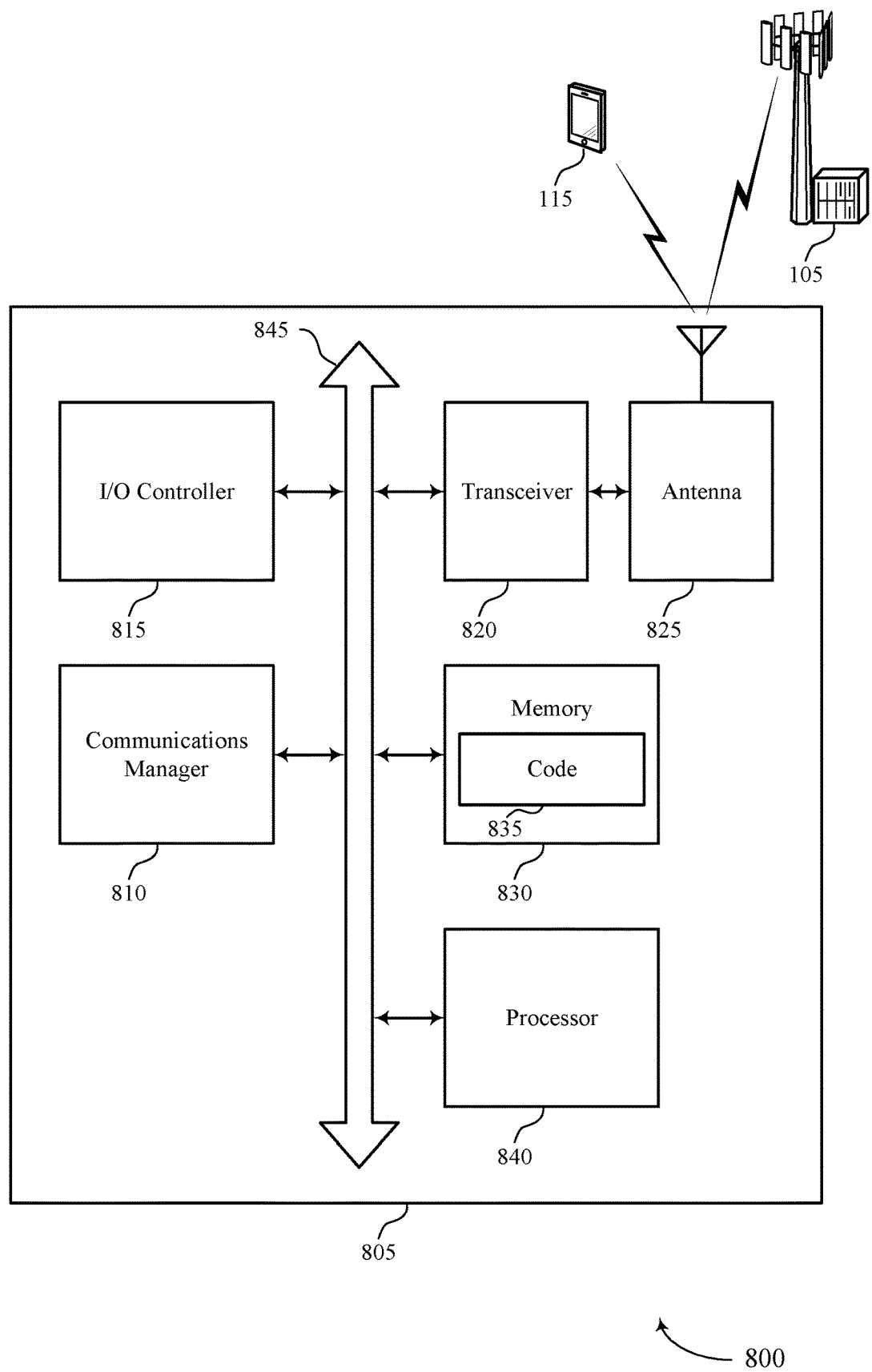
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a duty cycle function corresponding to a duty cycle range, identify a bandwidth allocation for the UE, determine a duty cycle within the duty cycle range based on the duty cycle function and the bandwidth allocation, and transmit a packet within the bandwidth allocation in accordance within the duty cycle.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic duty cycle).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
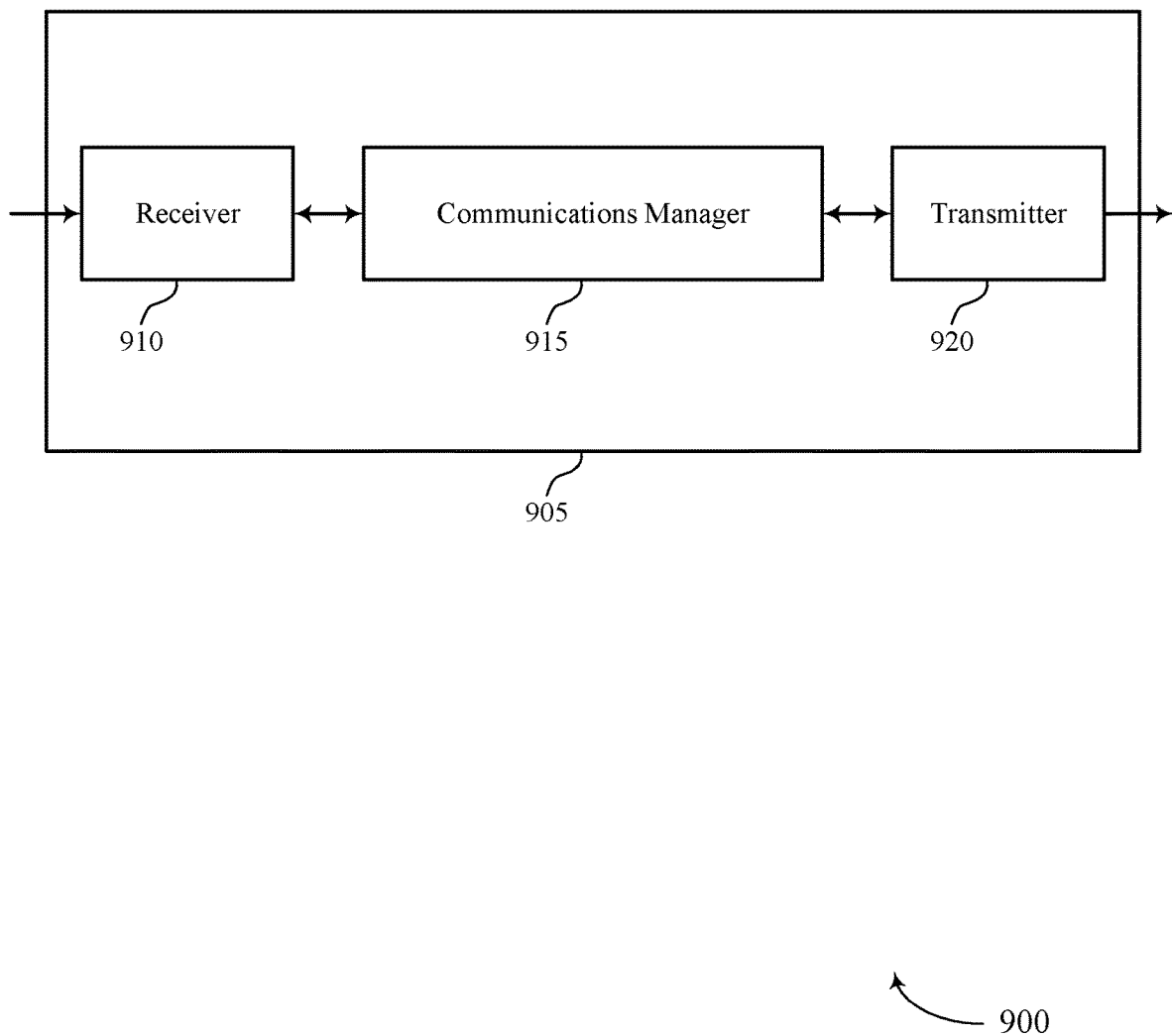
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to dynamic duty cycle, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may configure a UE with a duty cycle function corresponding to a duty cycle range, configure the UE with a bandwidth allocation, determine a duty cycle within the duty cycle range based on the duty cycle function and the bandwidth allocation, and monitor for a packet transmitted by the UE within the bandwidth allocation in accordance within the duty cycle. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
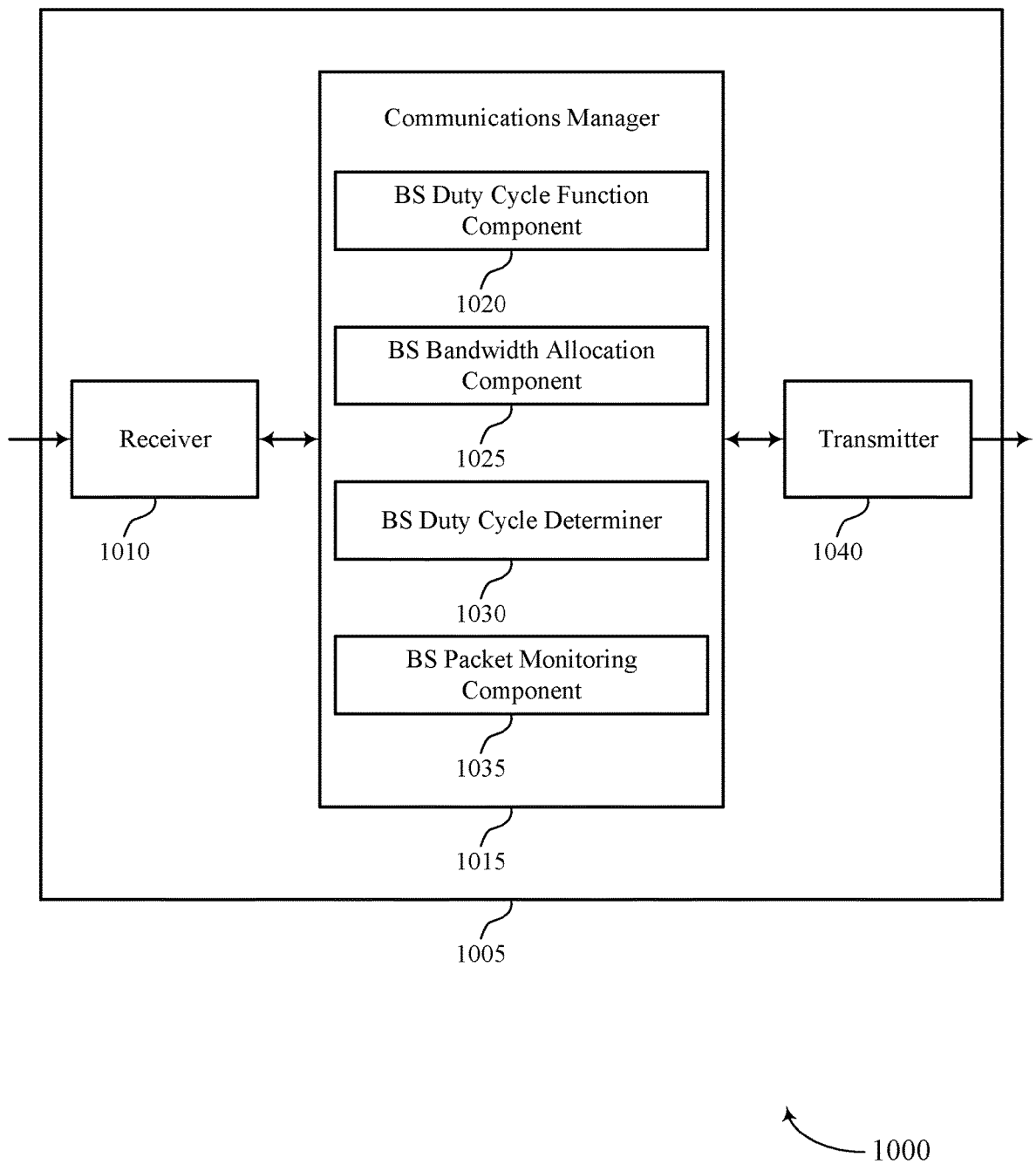

FIG. 10 shows a block diagram 1000 of a device 1005 in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to dynamic duty cycle, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a BS duty cycle function component 1020, a BS bandwidth allocation component 1025, a BS duty cycle determiner 1030, and a BS packet monitoring component 1035. The communications manager 1015 may be an example of aspects of the communications manager 1210 described herein. The actions performed by the communications manager 1015 as described herein may be implemented to realize one or more potential advantages. One implementation may allow the network to have a greater amount of control over which functions a UE is to use in a given traffic situation.

The BS duty cycle function component 1020 may configure a UE with a duty cycle function corresponding to a duty cycle range.

The BS bandwidth allocation component 1025 may configure the UE with a bandwidth allocation.

The BS duty cycle determiner 1030 may determine a duty cycle within the duty cycle range based on the duty cycle function and the bandwidth allocation.

The BS packet monitoring component 1035 may monitor for a packet transmitted by the UE within the bandwidth allocation in accordance within the duty cycle.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
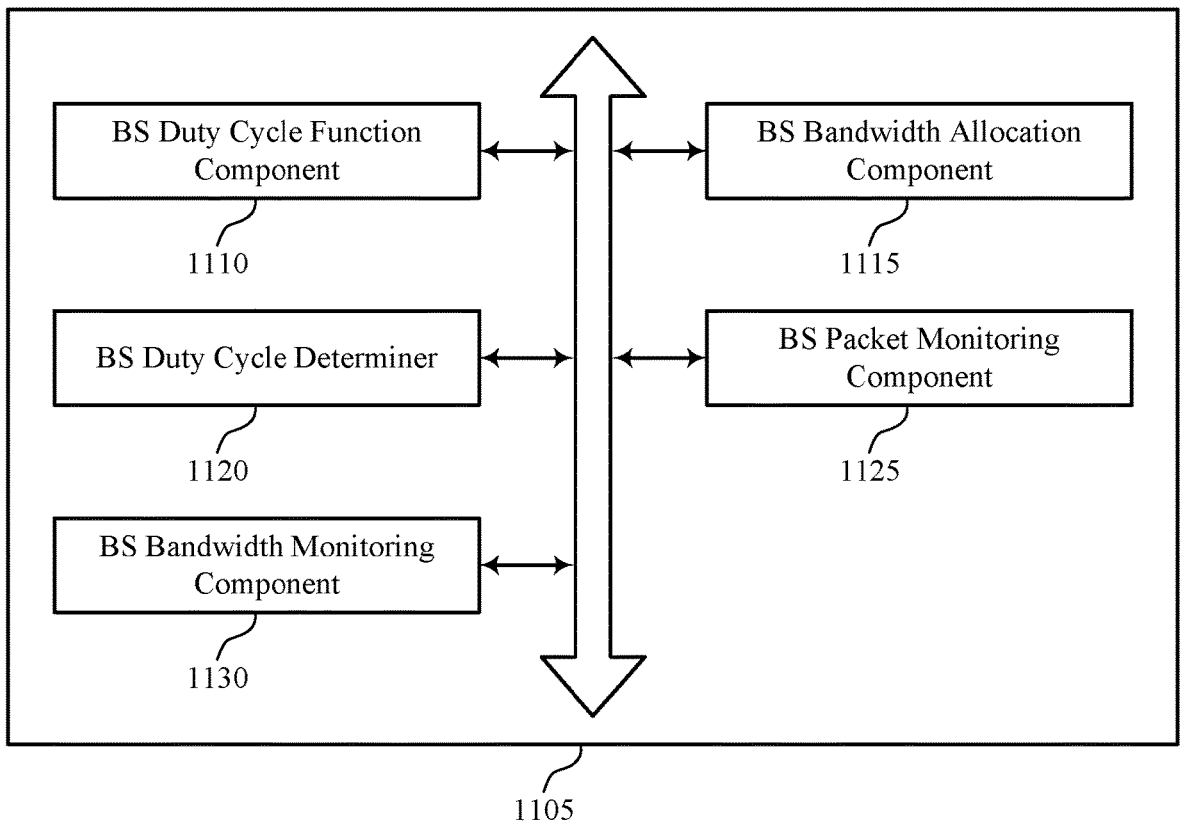
FIG. 11 shows a block diagram of a communications manager in accordance with aspects of the present disclosure.

FIG. 11 shows a block diagram 1100 of a communications manager 1105 in accordance with aspects of the present disclosure. The communications manager 1105 may be an example of aspects of a communications manager 915, a communications manager 1015, or a communications manager 1210 described herein. The communications manager 1105 may include a BS duty cycle function component 1110, a BS bandwidth allocation component 1115, a BS duty cycle determiner 1120, a BS packet monitoring component 1125, and a BS bandwidth monitoring component 1130. Each of these modules may communicate, directly or indirectly, with one another (e.g., via one or more buses).

The BS duty cycle function component 1110 may configure a UE with a duty cycle function corresponding to a duty cycle range. In some examples, the BS duty cycle function component 1110 may transmit control signaling indicating the duty cycle function from a set of different duty cycle functions. In some examples, the BS duty cycle function component 1110 may select the duty cycle function from a set of different duty cycle functions based on a congestion metric. In some cases, the congestion metric is generated based on a signal measurement, a reference signal received power measurement, a reference signal received quality measurement, a received signal strength indicator, or any combination thereof.

In some cases, the duty cycle function is a linear function over the bandwidth allocation, a non-linear function linear function over the bandwidth allocation, a piecewise linear function over the bandwidth allocation, an exponential function over the bandwidth allocation, a step function over the bandwidth allocation, a constant value over the bandwidth allocation, or a tanh function over the bandwidth allocation.

The BS bandwidth allocation component 1115 may configure the UE with a bandwidth allocation. In some examples, the BS bandwidth allocation component 1115 may transmit control signaling indicating the bandwidth allocation.

The BS duty cycle determiner 1120 may determine a duty cycle within the duty cycle range based on the duty cycle function and the bandwidth allocation. In some examples, the BS duty cycle determiner 1120 may transmit control signaling indicating the duty cycle range. In some examples, the BS duty cycle determiner 1120 may transmit control signaling indicating a maximum duty cycle and a minimum duty cycle within the duty cycle range.

The BS packet monitoring component 1125 may monitor for a packet transmitted by the UE within the bandwidth allocation in accordance within the duty cycle. In some examples, the BS packet monitoring component 1125 may adjust a transmission rate based on the duty cycle. In some examples, the BS packet monitoring component 1125 may monitor for the packet based on the adjusted transmission rate. In some examples, the BS packet monitoring component 1125 may adjust a number of repetitions of the packet based on the duty cycle. In some examples, the BS packet monitoring component 1125 may monitor for repetitions of the packet based on the adjusted number of repetitions.

The BS bandwidth monitoring component 1130 may monitor the bandwidth allocation over a time window to determine a congestion metric. In some examples, the BS bandwidth monitoring component 1130 may transmit control signaling indicating the congestion metric.

Figure 12:
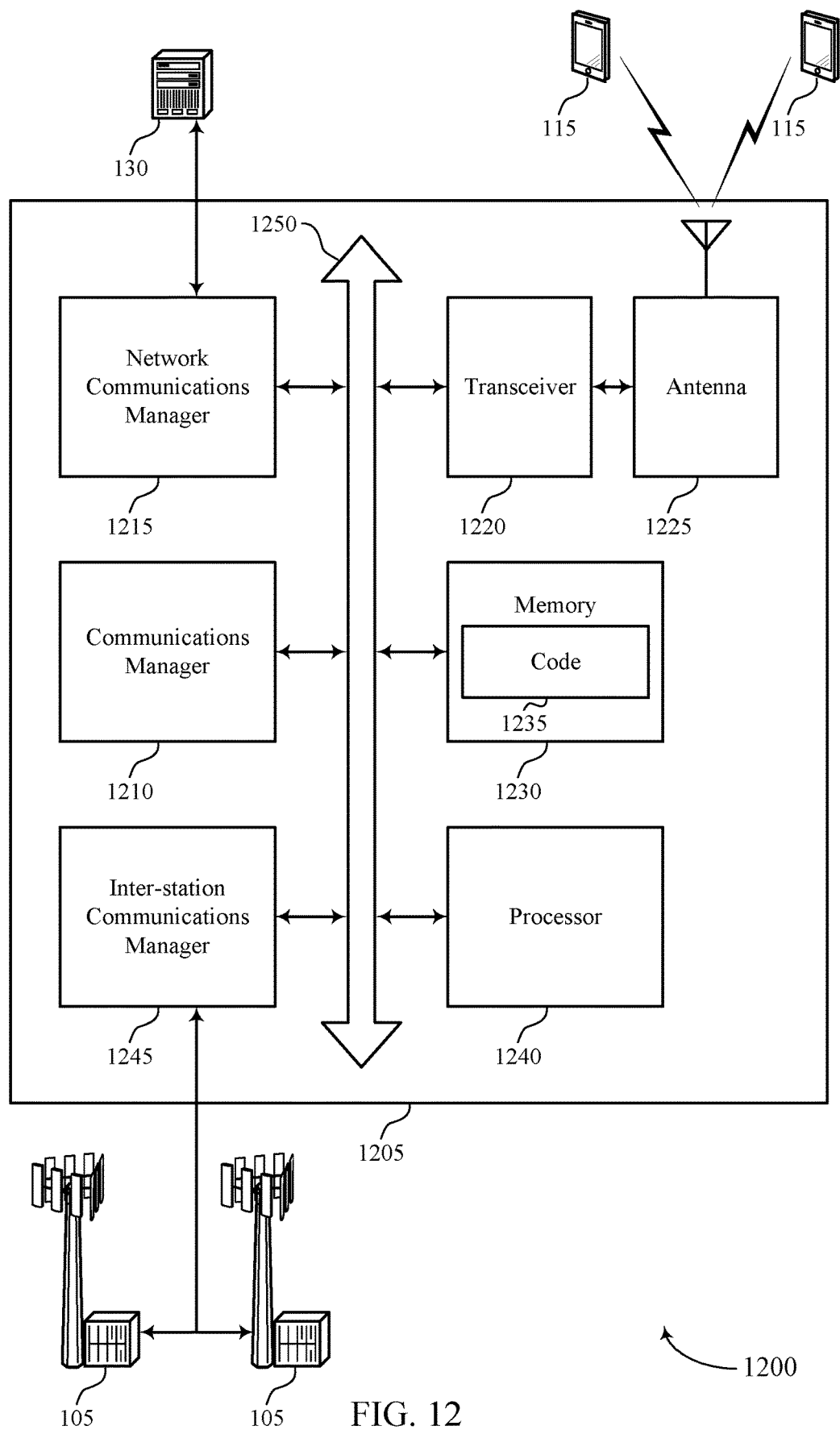
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may configure a UE with a duty cycle function corresponding to a duty cycle range, configure the UE with a bandwidth allocation, determine a duty cycle within the duty cycle range based on the duty cycle function and the bandwidth allocation, and monitor for a packet transmitted by the UE within the bandwidth allocation in accordance within the duty cycle.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting dynamic duty cycle).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
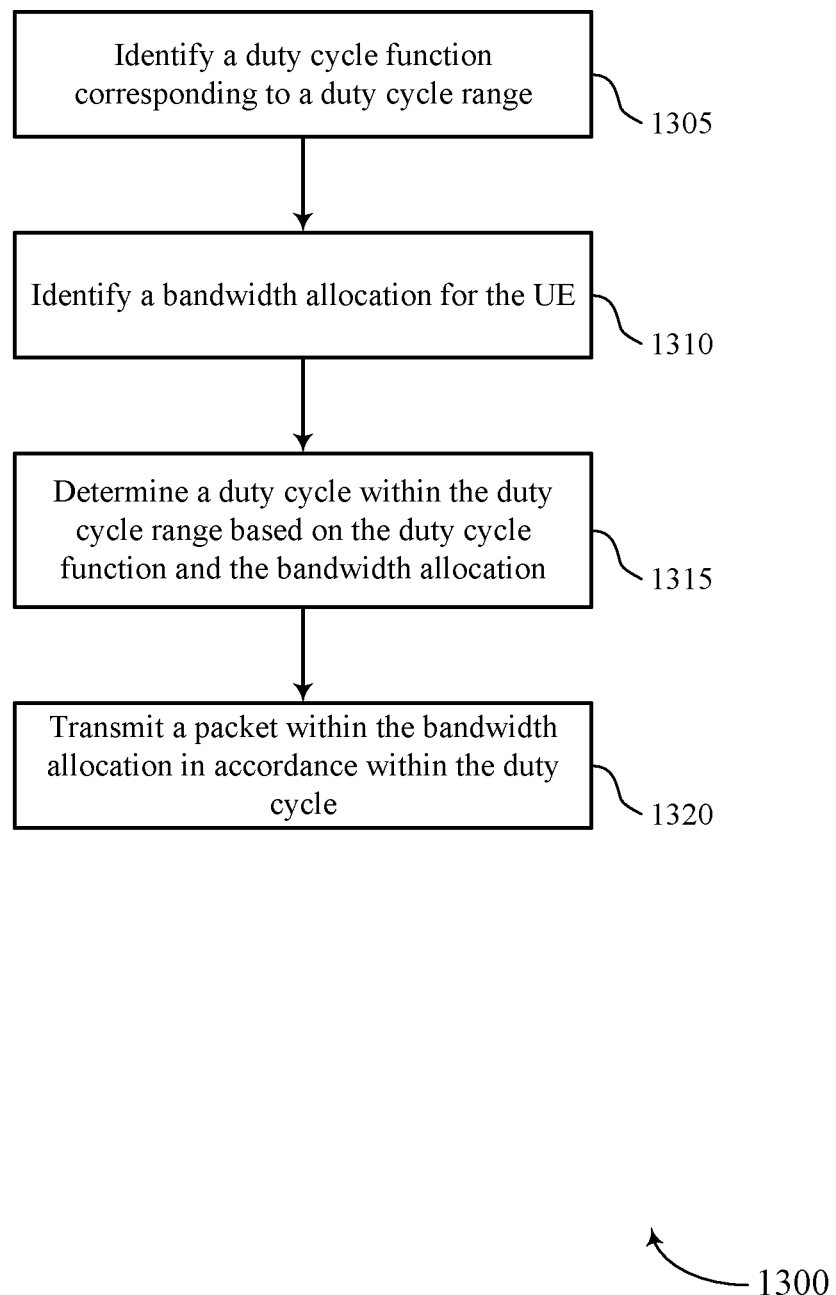
FIGS. 13 through 16 show flowcharts illustrating methods in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a duty cycle function corresponding to a duty cycle range. The operations of 1305 may be performed according to the methods described herein. In some examples, aspects of the operations of 1305 may be performed by a UE duty cycle function component as described with reference to FIGS. 5 through 8.

At 1310, the UE may identify a bandwidth allocation for the UE. The operations of 1310 may be performed according to the methods described herein. In some examples, aspects of the operations of 1310 may be performed by a UE bandwidth allocation component as described with reference to FIGS. 5 through 8.

At 1315, the UE may determine a duty cycle within the duty cycle range based on the duty cycle function and the bandwidth allocation. The operations of 1315 may be performed according to the methods described herein. In some examples, aspects of the operations of 1315 may be performed by a UE duty cycle determiner as described with reference to FIGS. 5 through 8.

At 1320, the UE may transmit a packet within the bandwidth allocation in accordance within the duty cycle. The operations of 1320 may be performed according to the methods described herein. In some examples, aspects of the operations of 1320 may be performed by a UE packet component as described with reference to FIGS. 5 through 8.

Figure 14:
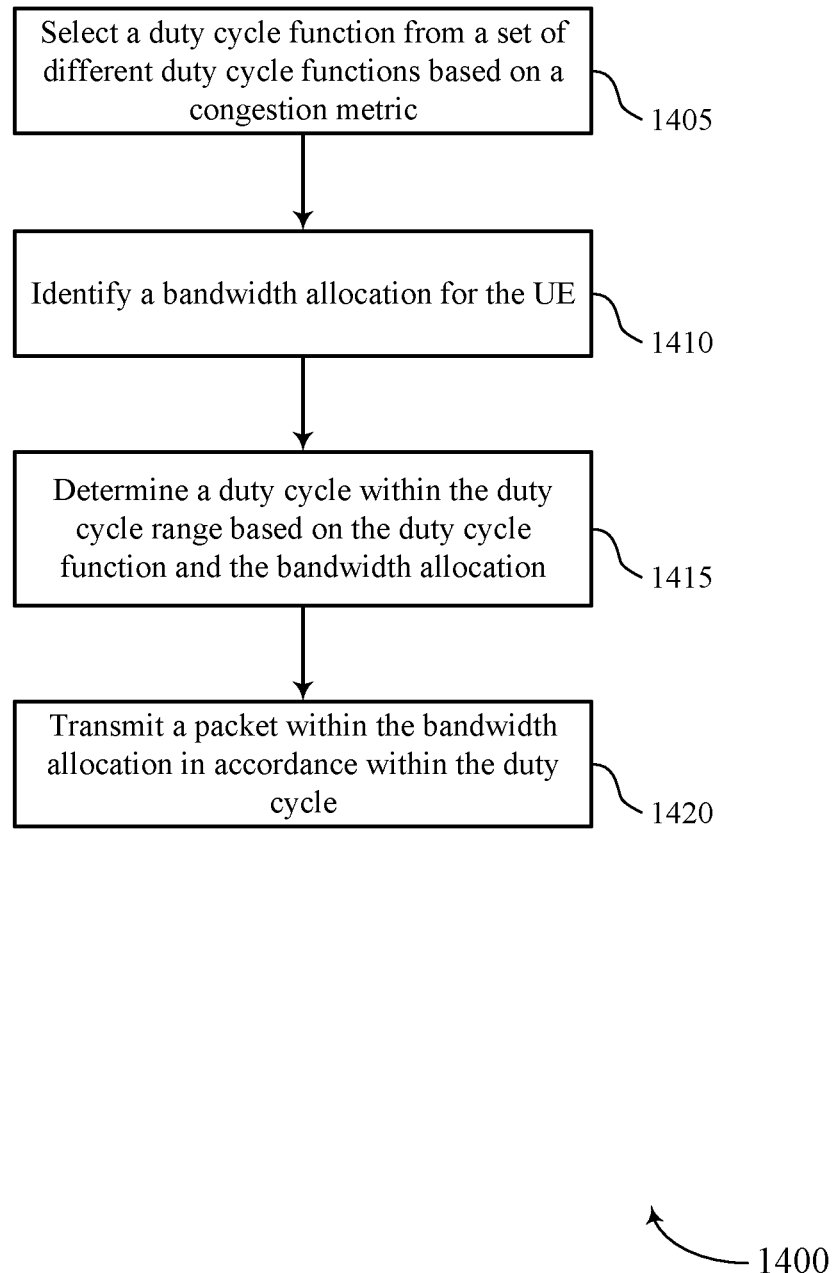

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may select a duty cycle function from a set of different duty cycle functions based on a congestion metric. The operations of 1405 may be performed according to the methods described herein. In some examples, aspects of the operations of 1405 may be performed by a UE duty cycle function component as described with reference to FIGS. 5 through 8.

At 1410, the UE may identify a bandwidth allocation for the UE. The operations of 1410 may be performed according to the methods described herein. In some examples, aspects of the operations of 1410 may be performed by a UE bandwidth allocation component as described with reference to FIGS. 5 through 8.

At 1415, the UE may determine a duty cycle within the duty cycle range based on the duty cycle function and the bandwidth allocation. The operations of 1415 may be performed according to the methods described herein. In some examples, aspects of the operations of 1415 may be performed by a UE duty cycle determiner as described with reference to FIGS. 5 through 8.

At 1420, the UE may transmit a packet within the bandwidth allocation in accordance within the duty cycle. The operations of 1420 may be performed according to the methods described herein. In some examples, aspects of the operations of 1420 may be performed by a UE packet component as described with reference to FIGS. 5 through 8.

Figure 15:
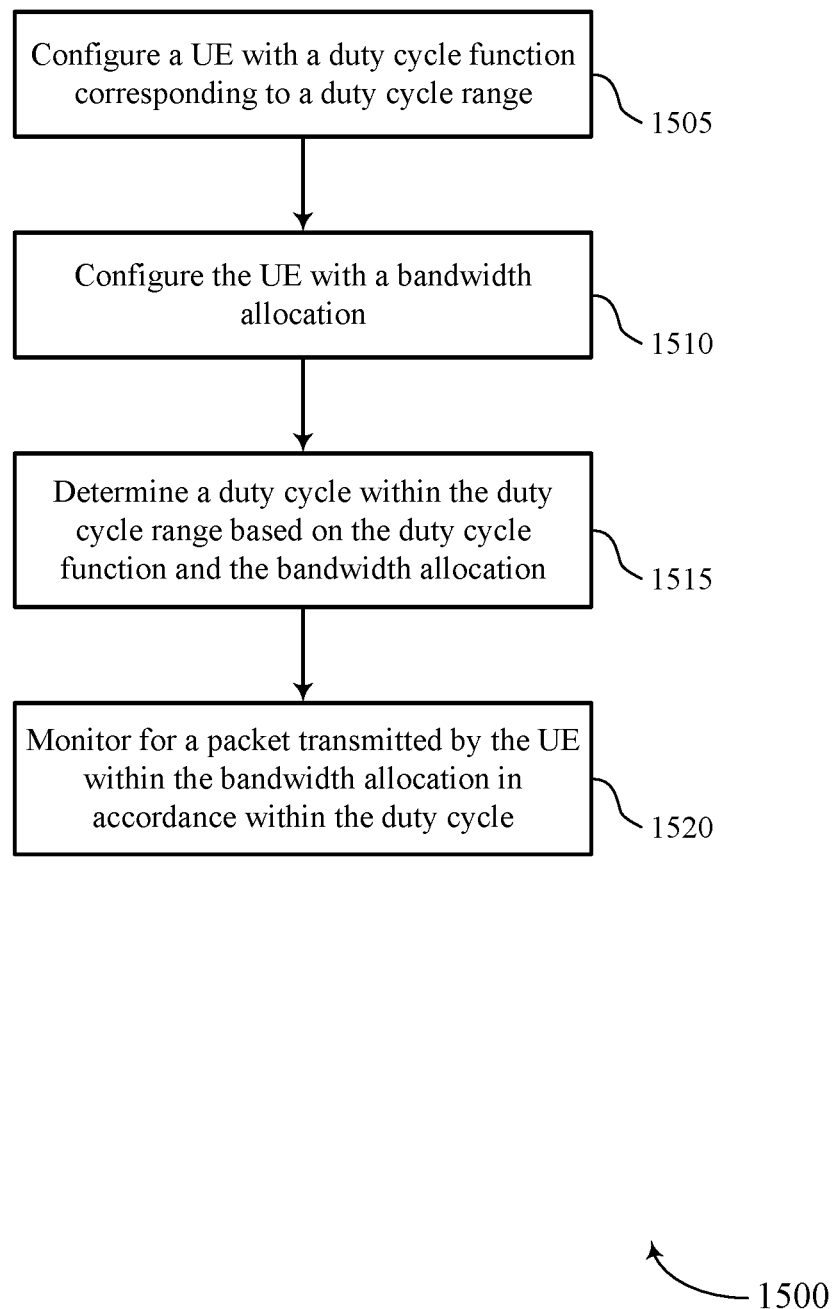

FIG. 15 shows a flowchart illustrating a method 1500 in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may configure a UE with a duty cycle function corresponding to a duty cycle range. The operations of 1505 may be performed according to the methods described herein. In some examples, aspects of the operations of 1505 may be performed by a BS duty cycle function component as described with reference to FIGS. 9 through 12.

At 1510, the base station may configure the UE with a bandwidth allocation. The operations of 1510 may be performed according to the methods described herein. In some examples, aspects of the operations of 1510 may be performed by a BS bandwidth allocation component as described with reference to FIGS. 9 through 12.

At 1515, the base station may determine a duty cycle within the duty cycle range based on the duty cycle function and the bandwidth allocation. The operations of 1515 may be performed according to the methods described herein. In some examples, aspects of the operations of 1515 may be performed by a BS duty cycle determiner as described with reference to FIGS. 9 through 12.

At 1520, the base station may monitor for a packet transmitted by the UE within the bandwidth allocation in accordance within the duty cycle. The operations of 1520 may be performed according to the methods described herein. In some examples, aspects of the operations of 1520 may be performed by a BS packet monitoring component as described with reference to FIGS. 9 through 12.

Figure 16:
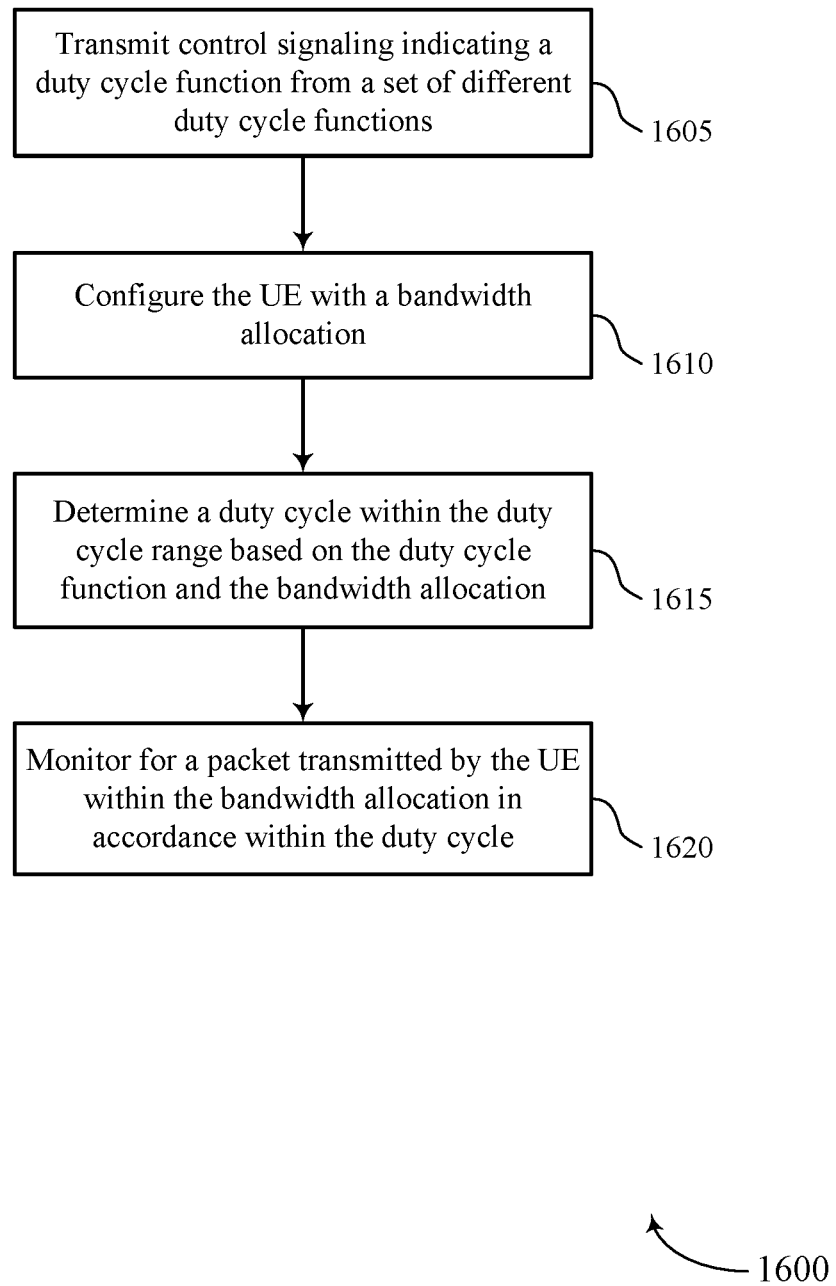

FIG. 16 shows a flowchart illustrating a method 1600 in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit control signaling indicating a duty cycle function from a set of different duty cycle functions. The operations of 1605 may be performed according to the methods described herein. In some examples, aspects of the operations of 1605 may be performed by a BS duty cycle function component as described with reference to FIGS. 9 through 12.

At 1610, the base station may configure the UE with a bandwidth allocation. The operations of 1610 may be performed according to the methods described herein. In some examples, aspects of the operations of 1610 may be performed by a BS bandwidth allocation component as described with reference to FIGS. 9 through 12.

At 1615, the base station may determine a duty cycle within the duty cycle range based on the duty cycle function and the bandwidth allocation. The operations of 1615 may be performed according to the methods described herein. In some examples, aspects of the operations of 1615 may be performed by a BS duty cycle determiner as described with reference to FIGS. 9 through 12.

At 1620, the base station may monitor for a packet transmitted by the UE within the bandwidth allocation in accordance within the duty cycle. The operations of 1620 may be performed according to the methods described herein. In some examples, aspects of the operations of 1620 may be performed by a BS packet monitoring component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   identifying a duty cycle function corresponding to a duty cycle range;
   determining a duty cycle within the duty cycle range based at least in part on the duty cycle function and a size of a bandwidth allocation for the UE; and
   transmitting a packet within the bandwidth allocation in accordance with the duty cycle.

2. The method of claim 1, wherein identifying the duty cycle function comprises:
   retrieving the duty cycle function from a storage device of the UE.

3. The method of claim 1, wherein the duty cycle function is a linear function over the size of the bandwidth allocation, a non-linear function over the size of the bandwidth allocation, a piecewise linear function over the size of the bandwidth allocation, an exponential function over the size of the bandwidth allocation, a step function over the size of the bandwidth allocation, a constant value over the size of the bandwidth allocation, or a hyperbolic tangent function over the size of the bandwidth allocation.

4. The method of claim 1, wherein transmitting the packet comprises:
   adjusting a transmission rate based at least in part on the duty cycle; and
   transmitting the packet based at least in part on the adjusted transmission rate.

5. The method of claim 1, further comprising:
   adjusting a number of repetitions of the packet based at least in part on the duty cycle; and
   transmitting repetitions of the packet based at least in part on the adjusted number of repetitions.

6. The method of claim 1, further comprising:
   receiving control signaling indicating the duty cycle range.

7. The method of claim 6, wherein receiving the control signaling comprises:
   receiving control signaling indicating a maximum duty cycle and a minimum duty cycle within the duty cycle range.

8. The method of claim 1, further comprising:
   receiving control signaling indicating the size of the bandwidth allocation.

9. The method of claim 1, wherein transmitting the packet comprises:
   transmitting the packet to one or more of a wireless entity or a second UE.

10. The method of claim 1, wherein transmitting the packet comprises:
    broadcasting the packet to one or more of a wireless entity or at least one additional UE.

11. The method of claim 1, wherein transmitting the packet comprises:

transmitting the packet to one or more of a wireless entity or at least one additional UE in a vehicle to everything (V2X) system.

12. The method of claim 1, wherein identifying the duty cycle function comprises:
selecting the duty cycle function from a plurality of different duty cycle functions based at least in part on a congestion metric.

13. The method of claim 12, wherein the congestion metric is generated based at least in part on a signal measurement, a reference signal received power measurement, a reference signal received quality measurement, a received signal strength indicator, or any combination thereof.

14. The method of claim 12, further comprising:
performing measurements over a time window to generate the congestion metric.

15. The method of claim 12, further comprising:
monitoring the size of the bandwidth allocation over a time window to determine the congestion metric.

16. The method of claim 12, further comprising:
receiving control signaling indicating the congestion metric.

17. The method of claim 1, wherein identifying the duty cycle function comprises:
receiving control signaling indicating the duty cycle function from a plurality of different duty cycle functions.

18. An apparatus for wireless communications by a user equipment (UE), comprising:
at least one processor; and
at least one memory coupled to the at least one processor, the at least one memory comprising instructions executable by the at least one processor to cause the apparatus to:
identify a duty cycle function corresponding to a duty cycle range;
determine a duty cycle within the duty cycle range based at least in part on the duty cycle function and a size of a bandwidth allocation for the UE; and
transmit a packet within the bandwidth allocation in accordance with the duty cycle.

19. The apparatus of claim 18, wherein the instructions to identify the duty cycle function are further executable by the at least one processor to cause the apparatus to:
retrieve the duty cycle function from a storage device of the UE.

20. The apparatus of claim 18, wherein the duty cycle function is a linear function over the bandwidth size of the allocation, a non-linear function over the size of the bandwidth allocation, a piecewise linear function over the size of the bandwidth allocation, an exponential function over the size of the bandwidth allocation, a step function over the size of the bandwidth allocation, a constant value over the size of the bandwidth allocation, or a hyperbolic tangent function over the size of the bandwidth allocation.

21. The apparatus of claim 18, wherein the instructions to transmit the packet are further executable by the at least one processor to cause the apparatus to:
adjust a transmission rate based at least in part on the duty cycle; and
transmit the packet based at least in part on the adjusted transmission rate.

22. The apparatus of claim 18, wherein the instructions are further executable by the at least one processor to cause the apparatus to:
adjust a number of repetitions of the packet based at least in part on the duty cycle; and
transmit repetitions of the packet based at least in part on the adjusted number of repetitions.

23. The apparatus of claim 18, wherein the instructions are further executable by the at least one processor to cause the apparatus to:
receive control signaling indicating the duty cycle range.

24. The apparatus of claim 23, wherein the instructions to receive the control signaling are further executable by the at least one processor to cause the apparatus to:
receive control signaling indicating a maximum duty cycle and a minimum duty cycle within the duty cycle range.

25. The apparatus of claim 18, wherein the instructions to determine the duty cycle within the duty cycle range based at least in part on the duty cycle function and the size of the bandwidth allocation for the UE are further executable by the at least one processor to cause the apparatus to:
receive control signaling indicating the size of the bandwidth allocation.

26. The apparatus of claim 18, wherein the instructions to transmit the packet are further executable by the at least one processor to cause the apparatus to:
transmit the packet to one or more of a wireless entity or a second UE.

27. The apparatus of claim 18, wherein the instructions to transmit the packet are further executable by the at least one processor to cause the apparatus to:
broadcast the packet to one or more of a wireless entity or at least one additional UE.

28. The apparatus of claim 18, wherein the instructions to transmit the packet are further executable by the at least one processor to cause the apparatus to:
transmit the packet to one or more of a wireless entity or at least one additional UE in a vehicle to everything (V2X) system.

29. An apparatus for wireless communications by a user equipment (UE), comprising:
means for identifying a duty cycle function corresponding to a duty cycle range;
means for determining a duty cycle within the duty cycle range based at least in part on the duty cycle function and a size of a bandwidth allocation for the UE; and
means for transmitting a packet within the bandwidth allocation in accordance with the duty cycle.

30. A non-transitory computer-readable medium storing code for wireless communications at a user equipment (UE), the code comprising instructions executable by at least one processor to:
identify a duty cycle function corresponding to a duty cycle range;
determine a duty cycle within the duty cycle range based at least in part on the duty cycle function and a size of a bandwidth allocation for the UE; and
transmit a packet within the bandwidth allocation in accordance with the duty cycle.

* * * * *